United States Patent Office 3,404,963
Patented Oct. 8, 1968

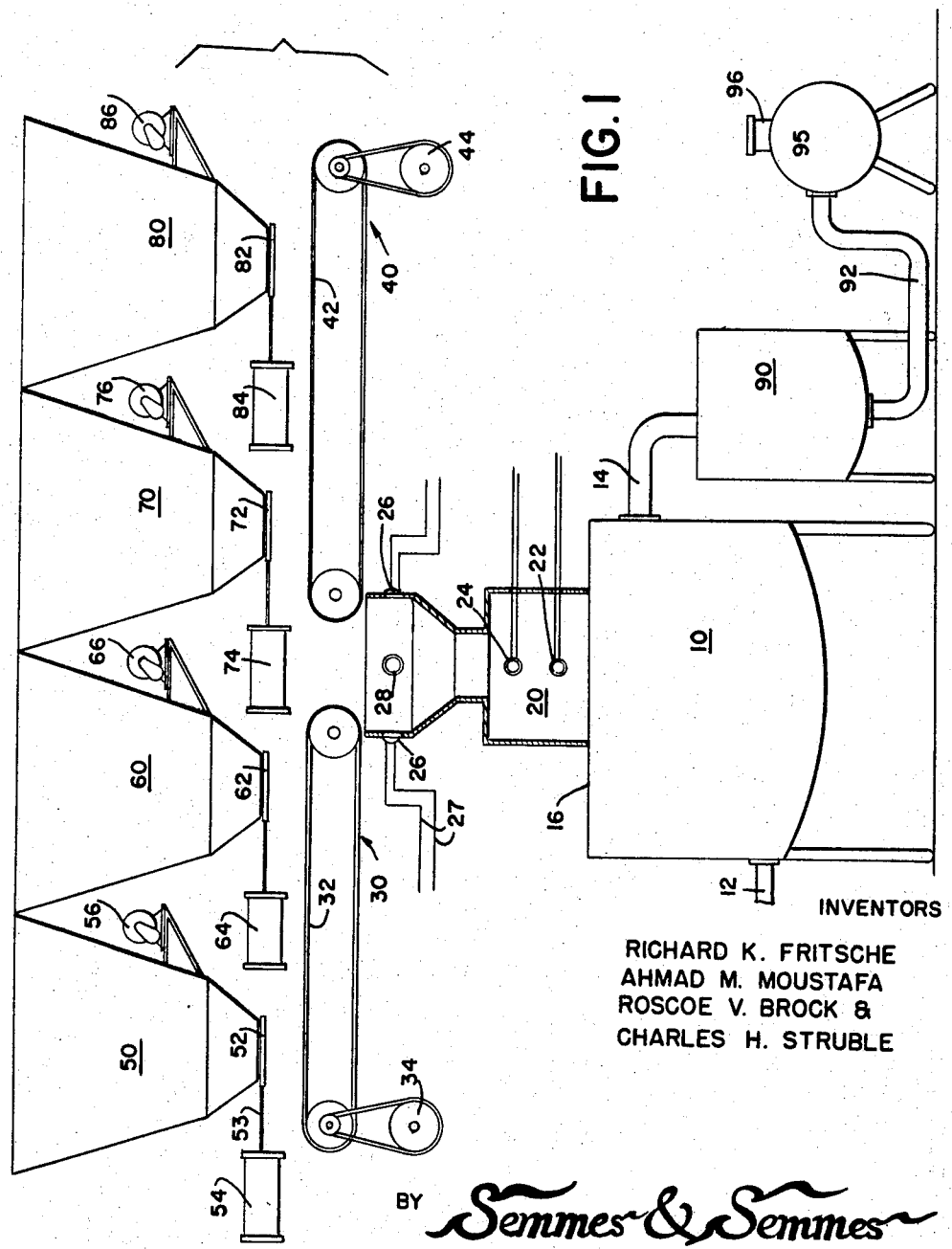

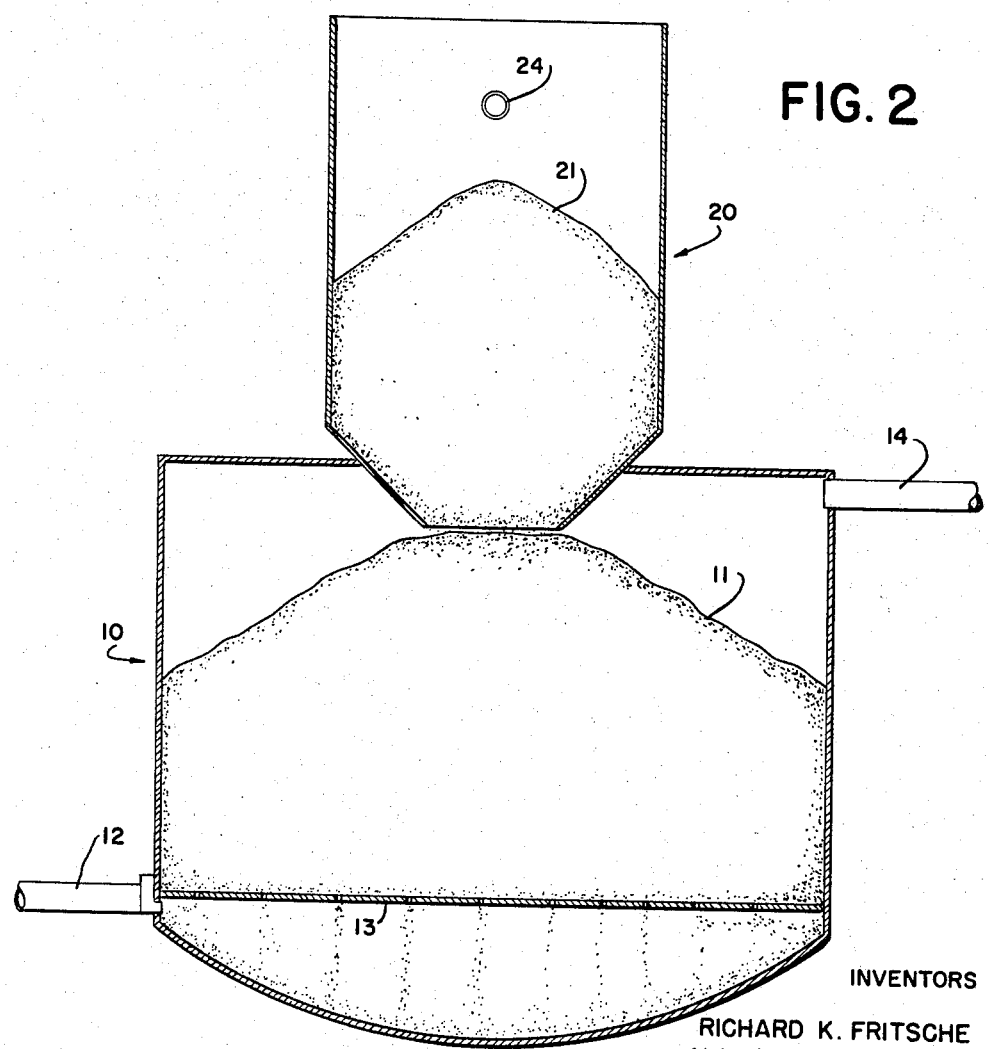

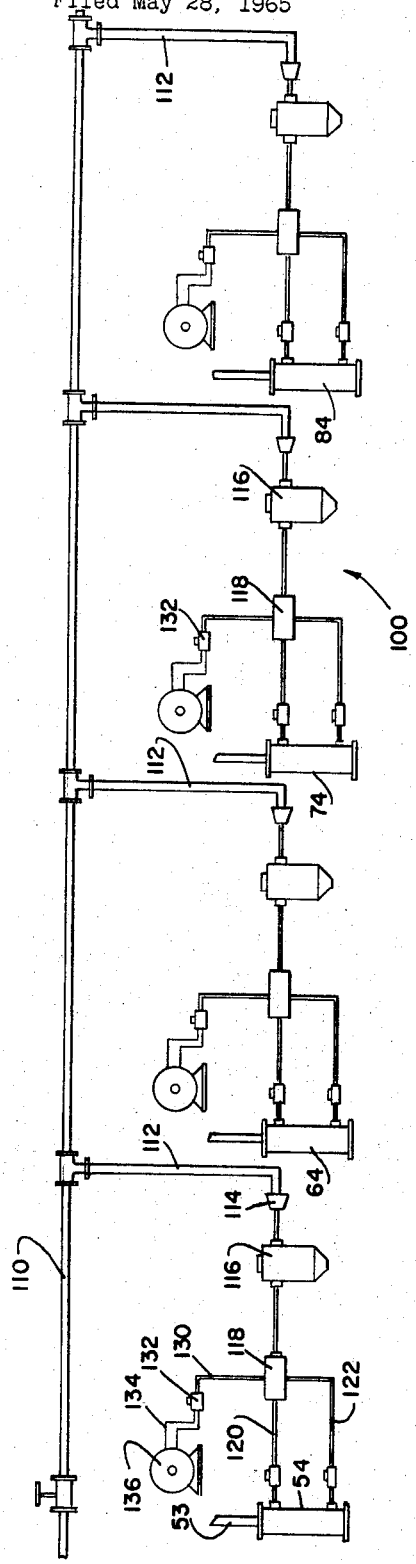

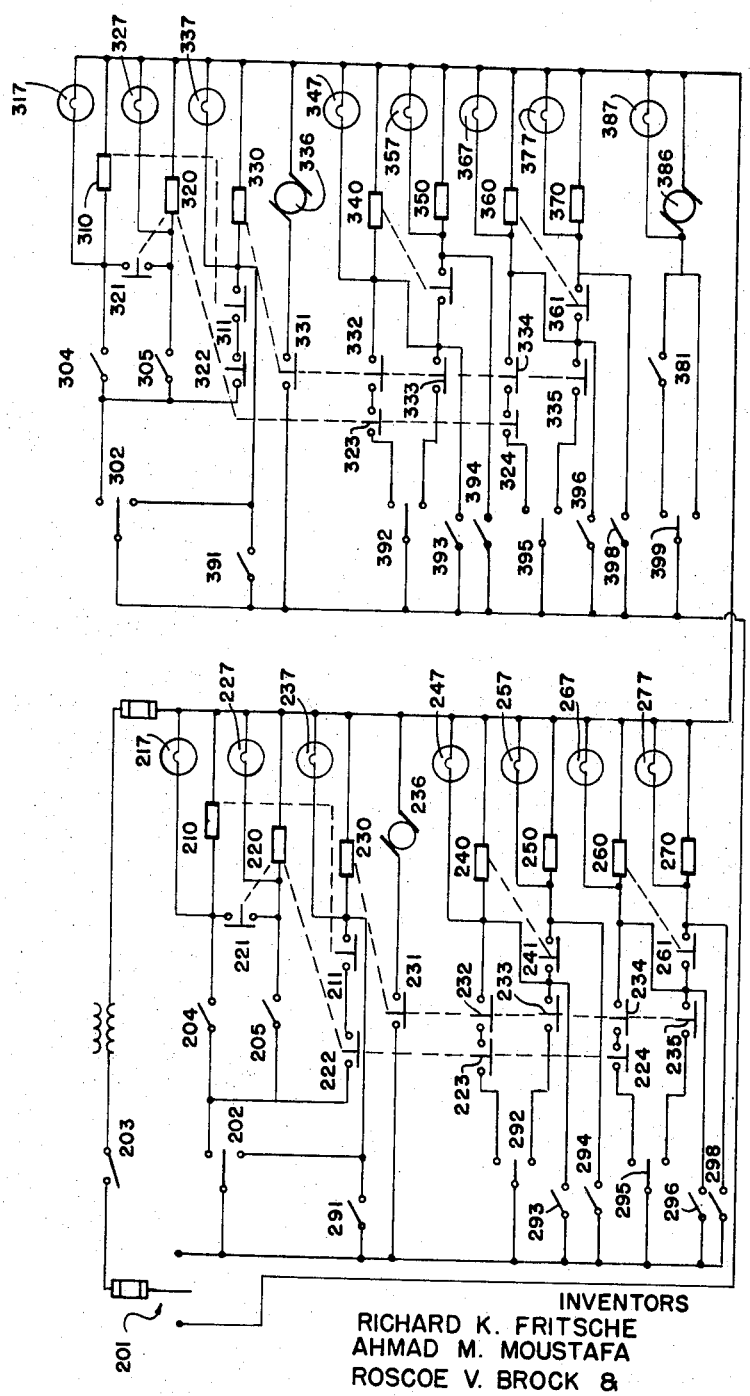

3,404,963
SALT DISSOLVER WITH AUTOMATIC SALT
LEVEL CONTROLLER
Richard K. Fritsche, Fort Thomas, Ky., and Ahmad M. Moustafa, Roscoe V. Brock, and Charles H. Struble, Cincinnati, Ohio, assignors to The Miami Margarine Company, Cincinnati, Ohio, a corporation of Ohio
Filed May 28, 1965, Ser. No. 459,675
6 Claims. (Cl. 23—270)

This invention concerns a method for continuously dissolving a solute in a solvent. Described herein is a process for perculating a fluid through a constantly replenished salt bed, thereby continually producing a solution having a desired solute-solvent ratio.

In the manufacture of margarine, sodium chloride is added at levels selected depending on the taste of consumers. Under normal operating conditions, the salt fraction called for in a formula is dissolved in the water phase prior to mixing with other ingredients. In order to obtain a precise solution, operations have necessitated batch mixing, which required direct personal control, with relatively high labor and manufacturing costs.

According to Stokes, whenever relative motion exists between a particle and surrounding fluid, the fluid will exert a drag upon the particle. Except for extraneous effects such as turbulence, it makes no difference whether a fluid moves past a particle or a particle moves through a fluid. A particle relatively falling under the action of gravity will accelerate until drag force just balances gravitational force. Thereafter, the particle will continue relatively to fall at a constant rate. Thus, in brining operations, it is important to adjust a flow rate so that gravitational forces of a solute are always greater than the drag force of a solvent upon the solute.

Experimental work with a model system using tap water as a solvent and sodium chloride crystals as a solid with a mesh size range of 0.0331 to 0.0083 inch indicated that salt dissolution and solvent saturation depend upon rate of flow and depth of the solute bed. 100% saturation was achieved with a water percolation of 150 gallons per hour per square foot of solute surface. Higher flow rates raised drag over gravitational forces and resulted in considerable salt carry over.

In order to have a continuous system, provision must be made to maintain a salt bed in a depth ranging from 20 to 24 inches, by providing for the continual replenishing of dissolved salt. Failure to maintain the bed at a substantially constant depth will result in decreased solvent saturation, increased salt carry over as the bed height decreases, and ultimately complete fluidation of the bed as it becomes shallow.

Accordingly, one of the several objectives of this invention is the providing of a continuous brining system.

Another object of this invention is the providing of a method for continuously replenishing a material being consumed.

This invention has as one other objective the providing of feeding apparatus capable of automatically replenishing a consumed mass.

Another object of this invention is the provision of electrical control circuits and devices capable of continually operating feeding equipment to maintain a required material level.

Further objects of the invention will be apparent from the specification and from the drawings in which:

FIGURE 1 is a schematic view of apparatus for a continuous brining system;

FIGURE 2 is a section of brining tank and stand pipe;

FIGURE 3 is a schematic of a pneumatic control system employed in the brining system;

FIGURE 4 is a schematic diagram of electrical controls for continuous brining operations.

The apparatus

Referring to FIGURE 1, brining tank 10, having inlet 12 and outlet 14, supports at its top 16 a stand pipe 20. Diaphragm limit switches 22 and 24 are mounted in the stand pipe in vertically spaced relationship. Master limit switches 26 and 28 override the system limit switches 22 and 24 to prevent stand pipe overflow.

Similar opposed conveyors 30 and 40 comprise continuous belts 32 and 42 respectively operated by motors 34 and 44. Bins 50, 60, 70 and 80 hold solute, in this case salt, for delivery via conveyors and stand pipe to brining tank 10. Valve 52 is operated by air cylinder 54, and piston 53. When cylinder 54 is actuated and when valve 52 is open, a valve travel limit switch completes power supply to vibrator 56, which shakes bin 50 to ensure continuous flow therefrom. In the same manner, air cylinder 64, 74 and 84 respectively operate valves 62, 72 and 82. Vibrators 66, 76 and 86 shake individual tanks while respective valves open.

Referring to FIGURE 2, salt level 11 is maintained in brining tank 10. Inlet 12 introduces solvent, in the form of water or milk through perforated distributing pipes 13. The solvent percolates upwardly through salt bed 11 and a saturated salt solution discharges into a circular weir and out through outlet 14. Salt supply 21 is held in stand pipe 20 for constant replenishing of the salt bed in brining tank 10. In FIGURE 2, upper limit switch 24 is visible.

Air cylinder 54 and piston 53 are shown at the extreme left side of FIGURE 3. Pressurized air occupies supply lines 110 and 112, reducer 114 and oil cleaner 116. Solenoid valve 118 normally supplies air through pipe 122 to urge the valve toward its closed position. Alternatively, cylinder 54 and piston 53 may be spring loaded in an extended position. Upon electrical energization of solenoid 118, air is supplied to pipe 120, withdrawing piston 53, and opening valve 52 (FIGURE 1). Flow controls are interposed in lines 120 and 122 to regulate air flow.

At the same time, solenoid valve 118 supplies air to pipe 130 in order to operate vibrator 136. The vibrator may be air operated, or 132 may represent air operated switch electrically interconnecting 134 vibrator 136 with a source of power. As shown in the remainder of the drawings, cylinder 64, 74 and 84 are controlled by similar solenoid valves.

Referring to FIGURE 4, a power source is generally represented by opposed coils at the upper left hand portion of the schematic diagram. 201 represents a manually operated switch for selecting one conveyor and its associated bank of bins of solute storage bins.

Switch 202 selects automatic operation in its raised position and manual operation in the lower position. 203 represents master limit diaphragm switches 26 and 28. Upper limit diaphragm 24 or top limit switch is identified by numeral 204; switch 205 diagrammatically represents lower diaphragm or bottom limit switch 22.

As the salt level falls in the stand pipe below the top limit switch, switch 204 assumes its normally closed position, supplying power to relay or contactor 210, which closes contacts 211. As the salt level continues to fall below the bottom limit switch, 205 assumes its normally closed position, supplying power to relay contactor 220, which closes contacts 221, 222, 223 and 224. Contacts 221 complete a shunt across the bottom switch 205 so that as salt builds up and opens the bottom limit switch, top limit switch 204 remains in its normally closed position and supplies power to contactor 220.

With contacts 211 and 222 completed, power is supplied to contactor 230, which closes contacts 231, 232, 233, 234 and 235. Alternatively selecting manual operation by depressing switch 202, or closing manual override switch 29, supplies power to relay 230. Consequently, power is supplied to motor 236 or motor starter via closed contact 231.

When switch 292 is turned upwardly via the automatic operation, the closing of contacts 223 and 232 supplies power to relay 240 which operates solenoid valve 118 (FIGURE 3), supplying air to open gate valve 52. A mechanical limit switch on valve 52 may close contacts supplying power to vibrator 56. Alternatively, relay 240 completes contacts 241, which supply power to vibrator relay 250.

When switch 292 is depressed for manual override, conveyor relay 230 completes contacts 233 and valve limit switch 241 closes, providing power to vibrator relay 250. Switch 293 represents a manual bypass for supplying power to solenoid and vibrator relays 240 and 250. Switch 294 is manually operable to supply power to vibrator relay 250.

The lower circuits at the left hand side of FIGURE 4 duplicate the above apparatus for operating bin 60 (FIGURE 1). Switch 295 selects automatic (upper) or manual (lower) operation. Contacts 224 and 234 respectively completed by lower limit relay 220 and conveyor relay 230 activate solenoid relay 260. When switch 296 is depressed, completing contacts 235 and 261 supplies power to vibrator relay 270. Switches 296 and 298 override automatic operation.

If conveyor selector switch 201 is moved to the left, conveyor 40 and bins 70 and 80 are selected for operation. Numerals in the 300 series are similar to the previously discussed 200 series numerals, which identify controls for conveyor 30 and its associated bins 50 and 60.

Raising of selector switch 302 places the system in condition for automatic operation. As salt level within the stand pipe diminishes, top limit switch or upper diaphragm valve, represented by switch 304, closes supplying power to relay contactor 310, which closes contacts 311. As the salt level continues to diminish, bottom limit switch 305 closes, supplying power to relay contactor 320, shunting the bottom limit switch via a circuit containing contacts 321 and supplying power to conveyor relay 330 by closing contacts 322.

Relay 330 closes contacts 331, supplying current to conveyor motor 336. Contacts 323 and 332 cooperate to supply power to relay 340 which operates a solenoid control valve for bin 70.

Switch 392, which is depicted centered in an off position, is raised for automatic operating using bin 70 and is depressed for manual operation. Switch 393 represents a manual override which may supply power to relay contactors 340 and 350. Switch 394 may selectively provide power to relay 350, which operates vibrator 46 on bin 70. Switch 395 may be raised to select automatic operation using bin 80.

In automatic operation contacts 324 and 334 respectively operated by contactors 230 and 330 supply power to relay 360 which controls a solenoid valve for bin 80. Operation of relay 360 in turn completes switch 361 which supplies power to vibrator relay 370. Switches 396 and 398 override automatic operation of bin 80.

Raising switch 399 selects automatic operation of surge tank pump 95 (FIGURE 1). As the limit switch 381 is closed at a given level of solution in surge tank 90 (FIGURE 1) power supplied to pump motor 386 which exhausts the solution through pipe 96 (FIGURE 1).

Throughout FIGURE 4, numerals ending in 7, i.e. 227 and 347, represent lights indicating operative condition of associated relays.

The process

Important to the continuous milk brining system is the apparatus which continuously supplies a constant supply of solute (the salt sodium chloride) to ensure a constant depth salt bed to the brining tank 10. A stand pipe 20 is mounted directly above the milk brining tank 10, in free communication therewith. Vertically spaced diaphragms on a surface of the stand pipe operate limit switches 22 and 24. As salt builds up in the stand pipe, the first diaphragm distends, tripping switch 22 to its off position. The level continues to increase until a second diaphragm is distended, tripping switch 24 to its off position. When both switches are off, feed to stand pipe 20 ceases. As the salt level diminishes to a point below the upper diaphragm, upper switch 24 is urged to an on position; and as the level decreases below the lower diaphragm, the lower switch returns to an on position. Both switches being operative, the feeding resumes.

Four storage bins 50, 60, 70 and 80 are divided into banks of two, each bank supplying one conveyor line. Both conveyors 30 and 40 feed a common hopper equipped with a diaphragm which operates safety master limit switches 26 and 28. A manual switch selects one conveyor belt and one associated bin. As the demand circuit is completed, the conveyor belt starts; an air operated gate valve 52, 62, 72 or 82 allows salt to pass from the storage bin onto the belt. As the gate opens, a limit switch starts bin vibrator 56, 66, 76 or 86. The operation continues until both diaphragm demand switches 22 and 24 on stand pipe 20 are turned off, at which time the gate valve closes, stopping the vibrator, and halting the salt. Should the upper limit switch 24 on stand pipe 20 fail to open, salt feed will continue until it reaches the diaphragm on the hopper, causing it to distend, tripping the master limit switch to its off position, halting the entire system and sounding an alarm to notify the operator of the malfunction.

Percolation upwardly through the salt bed is carefully controlled to ensure maximum contact time between the solvent and solute, and to avoid any salt particle carryover as the milk overflows through a weir into a surge tank. A level switch in surge tank 90 controls pump 95 which conveys the brined milk through pipes 92 and 96 to a storage tank for use in margarine manufacture.

Although this invention has been described by specific embodiment, its teachings may be practiced in other manners without departing from the scope of the invention. Therefore, the precise limits of invention are defined only in the appended claims.

1. A continuous salt dissolving apparatus comprising:
 a vertical tank having a top opening;
 the solvent inlet fixed on a lower extremity of said tank and communicating with said tank;
 a solution outlet extending from the upper extremity of said tank and communicating with said tank;
 a stand pipe mounted atop said tank, said stand pipe having an open top and an open bottom communicating in sealed relationship with the top opening of said tank;
 first upper and second lower vertically spaced normally closed pressure sensitive limit switches mounted on said stand pipe and communicating with an interior of said stand pipe, said switches being operated by solute buildup distending and opening said switches;
 at least one horizontal conveyor having a discharge end positioned adjacent said stand pipe and directed into the open top of said stand pipe;
 a motor drivingly connected to said conveyor;
 at least one salt storage bin mounted over said conveyor, said bin having a discharge valve positioned over said conveyor;
 an actuator connected to said valve, said actuator operative to open said valve;
 solute disposed within said tank, said stand pipe and said bin;
 an electrical power source;
 electrical circuit means interconnecting said power source through said first and second switches to said motor and to said actuator; said electrical circuit means including a first circuit interconnecting said source, said first switch, and a first coil of a first contactor; a second circuit interconnecting said source, said second switch, and a second coil of a second contactor; a third circuit containing first contacts of said second contactor, said third circuit connected to said first circuit intermediate said first switch and said first coil and connected to said second circuit intermediate said second switch and said second coil; and a fourth circuit containing a third first contacts of said first contactor, second contacts of said second contactor, and interconnecting said source, said motor, and said actuator, said electrical circuit means being operable to stop solute supply to said standpipe by disconnecting said motor and said actuator from said electrical power source when said first switch is operated by solute buildup distending and opening said first switch, and being operable to resume solute supply to said standpipe by connecting said motor and said actuator with said electrical power source when said second switch returns to its normally closed position due to the solute level falling below said second switch.

2. The apparatus for claim 1 wherein said stand pipe extends into said tank to a level below said outlet, and wherein a lower portion of said stand pipe converges to define a restricted opening.

3. Apparatus of claim 2 additionally comprising:
a surge tank communicating with said outlet;
a pump communicating with said surge tank;
a reservoir; and
pipe interconnecting said pump and said reservoir.

4. The apparatus of claim 1 wherein said first and second switches comprise normally closed diaphragm switches, operated by solute buildup distending and opening said switches.

5. The apparatus of claim 1 wherein said limit switches comprise normally open pressure sensitive switches, and wherein said electrical circuit means comprises:
a first contactor having a first coil, first normally open contacts and first linking means interconnecting said first coil with said first contacts, and closing said first contacts upon energization of said first coil;
a second contactor having a second coil, second and third normally open contacts and second linking means interconnecting said second coil with said second and third contacts, and completing said second and third contacts upon energization of said second coil;
a third contactor having a third coil, fourth and fifth normally open contacts, and third linking means interconnecting said third coil with said fourth and fifth contacts, completing said fourth and fifth contacts upon energization of said third coil;

a first circuit interconnecting said source, said first limit switch and said first coil;
a second circuit interconnecting said source, said second limit switch, and said second coil;
a third circuit containing said second contacts and interconnecting said first and second circuits respectively at points between said first switch and said first coil and between said second switch and said second coil;
a fourth circuit interconnecting said power source, said first contacts, said third contacts and said third coil;
a fifth circuit interconnecting said source, said fourth contacts and said motor;
a sixth circuit interconnecting said source, said fifth contacts and said actuator.

6. Apparatus of claim 1 wherein said at least one conveyor comprises first and second opposed conveyors having respective discharge ends positioned adjacent said stand pipe and directed into the open top of said stand pipe;
first and second motors respectively drivingly connected to said first and second conveyors;
first and second bins mounted over said first conveyor and second and third bins mounted over said second conveyor;
first, second, third and fourth discharge valves respectively mounted in said bins;
first, second, third and fourth actuators respectively operatively connected to said valves; and
wherein said electrical circuit means additionally comprises a third switch selectively interconnecting one of said motors with said source, a fourth switch selectively interconnecting one of said actuators with said source.

References Cited
UNITED STATES PATENTS

| | | | |
|---|---|---|---|
| 700,972 | 5/1902 | Noef | 23—270 |
| 2,412,106 | 12/1946 | Swartz | 23—272 X |
| 2,626,728 | 11/1953 | Harper | 222—57 |
| 2,684,288 | 7/1954 | De Sivet | 23—270 |
| 2,734,804 | 2/1956 | Courthope | 23—270 X |
| 2,738,258 | 3/1956 | Berg | 23—270 |
| 2,888,026 | 5/1959 | Henderson | 137—88 |
| 3,080,220 | 3/1963 | Lagatski | 23—312 |
| 3,198,386 | 8/1965 | Hartley | 222—56 X |
| 3,343,919 | 9/1967 | Miller | 23—312 X |

FOREIGN PATENTS

| | | |
|---|---|---|
| 613,271 | 1/1961 | Canada. |

NORMAN YUDKOFF, *Primary Examiner.*

S. EMERY, *Assistant Examiner.*